United States Patent
Delaney

(10) Patent No.: US 7,024,699 B1
(45) Date of Patent: Apr. 4, 2006

(54) PUBLICATION OF AN ATTORNEY-CLIENT PRIVILEGE WARNING MESSAGE

(76) Inventor: Michael P. Delaney, 33 Mallards Landing South, Waterford, NY (US) 12188

( * ) Notice: Subject to any disclaimer, the term of this patent is extended or adjusted under 35 U.S.C. 154(b) by 436 days.

(21) Appl. No.: 09/383,691

(22) Filed: Aug. 26, 1999

(51) Int. Cl.
*H04L 9/00* (2006.01)
*H04L 9/32* (2006.01)
*G06F 12/14* (2006.01)
*G06F 11/30* (2006.01)

(52) U.S. Cl. .............................. 726/27; 726/28; 726/29
(58) Field of Classification Search ................ 713/200; 726/27, 28, 29
See application file for complete search history.

(56) References Cited

U.S. PATENT DOCUMENTS

| | | | |
|---|---|---|---|
| 5,159,180 A | | 10/1992 | Feiler |
| 5,444,615 A | | 8/1995 | Bennett et al. |
| 5,584,025 A | * | 12/1996 | Keithley et al. .......... 707/104.1 |
| 5,649,099 A | * | 7/1997 | Theimer et al. ............. 713/201 |
| 5,838,966 A | | 11/1998 | Harlan |
| 5,875,431 A | | 2/1999 | Heckman et al. |
| 5,903,646 A | * | 5/1999 | Rackman ...................... 705/51 |

\* cited by examiner

Primary Examiner—Gilberto Barron, Jr.
Assistant Examiner—Benjamin E. Lanier
(74) Attorney, Agent, or Firm—Schmeiser, Olsen & Watts

(57) ABSTRACT

A method for publishing a privileged attorney-client communication message in response to a request for accessing a data object, such as a data file, in an attorney-client database. The method utilizes a computer system that includes a server having computer software, a database coupled to the server, and distributed nodes coupled to the server. The server checks to determine if the requested access should be blocked for a data security reason, such as failure of a logon check or lack of access permission relating to the sender of the request for access. If the requested access is not blocked for a security reason, the computer software determines whether the requested data object includes a privileged communication between an attorney and a client as determined, for example, by prior input from the attorney. If such privileged communication exists within the requested data object, the computer software determines whether a privileged communication message should be published at the node. A privileged communication message warns the user at the node that the user is about to view privileged attorney-client communication and should abandon the request if not authorized to view the attorney-client communication. If the user elects not to abandon the request, the user is given access to the requested data object.

30 Claims, 6 Drawing Sheets

The data you are about to access is privileged attorney-client communication

DO NOT ACCESS THIS DATA UNLESS

YOU ARE AUTHORIZED TO DO SO

FIG. 8

The data you are about to access is privileged attorney-client communication

DO NOT ACCESS THIS DATA UNLESS

YOUR NAME OR ACCESS CODE APPEARS BELOW

John Q. Lawyer

Alpha B. Associate

Mary H. Client gebitsu resluno

FIG. 9

PUBLICATION OF AN ATTORNEY-CLIENT PRIVILEGE WARNING MESSAGE

BACKGROUND OF THE INVENTION

1. Technical Field

The present invention relates to a data processing system and method for publishing a privileged communication message in relation to accessing a computer-stored confidential attorney-client communication that is privileged from being discovered during litigation.

2. Related Art

The attorney-client privilege (AC privilege) dates back to the sixteenth century and is the oldest confidential privilege. It is an evidentiary privilege which protects a confidential communication between attorney and client and serves to encourage open, candid, and full communication between attorney and client. This serves the administration of justice by enabling an attorney to give legal advice based on knowledge of all of the facts that prompted the client to seek legal counsel. On the other hand the AC privilege may result in a suppression of otherwise admissible evidence, thereby hindering the administration of justice by thwarting the fact-finding process. Accordingly, courts have articulated situations in which the AC privilege does not apply or is waived.

Waiver of the AC privilege may occur if the confidential communication has been accessed by a third party not authorized to have such access, especially if the attorney and/or the client have not taken adequate security measures to protect the confidentiality of the communication. For example, if the client reveals confidential information to the attorney at a dinner table in a public restaurant, and the conversation is overheard by a stranger sitting at an adjacent table in the restaurant, the client has most likely waived the AC privilege for the overheard conversation. If there has been a waiver, the conversation would be discoverable during pre-trial litigation and admissible as evidence at trial. On the other hand, if the client reveals confidential information to the attorney in the privacy of the attorney's office with the office door closed, and an electrician opens the door and unpermissively walks into the lawyer's office to repair a light fixture, it is debatable whether the attorney took adequate security measures to protect the AC privilege for the words of the conversation heard by the electrician. A court might decide that, even though the electrician had not intended to hear words of the conversation, the attorney should have taken some precautionary measures to deter a third person (i.e., the electrician) from walking into his office while the confidential conversation was in progress.

For reasons of economy and efficiency of communication with clients, it may be desirable for an attorney to have a computerized database system, such as a distributed-node server system, in which the attorney communicates with the clients via files in the database. Since some of such communications may be confidential, the AC privilege for such communications could be waived if, due to a breach in security, a third party gains unauthorized access to such confidential communications even if such access was not intended by the third party. The third party may be, inter alia, a client other than the intended client or one who is a stranger to the lawyer. A method and system is needed to deter an unauthorized third party from accessing such confidential communications stored in the database.

SUMMARY OF THE INVENTION

The present invention provides a first data processing method, comprising the steps of:
providing a server, a data object coupled to the server, and a node coupled to the server;
sending a request from the node to the server for access of the data object by the node, checking for whether the requested access is security blocked;
if the requested access is not security blocked, determining whether the data object includes a privileged communication (PCOM) between an attorney and a client of the attorney;
if the data object includes the PCOM, deciding whether a PCOM message for the data object is to be published at the node; and
if the PCOM message is to be published, publishing the PCOM message at the node.

The present invention provides a second data processing method, comprising the steps of:
a data object;
security means for determining whether an access to the data object is security blocked;
status means for making a determination as to whether the data object includes a PCOM between a first person and a second person;
publication means for publishing the PCOM message for the data object; and
decision means for deciding whether to execute the publication means to publish the PCOM message for the data object, wherein the decision means includes a dependence on the determination made by the status means.

The present invention provides a computer program product, comprising:
a recordable medium; and
computer software recorded on the recordable medium, wherein said computer software includes:
security software for determining whether an access to a data object is security blocked;
status software for making a determination as to whether the data object includes a privileged communication (PCOM) between an attorney and a client of the attorney;
publication software for publishing a PCOM message for the data object; and
decision software for deciding whether to execute the publication software to publish the PCOM message for the data object, wherein the decision software includes a dependence on the determination made by the status software.

The present invention has the advantage of deterring a third party from accessing confidential communications stored in a computerized database, as illustrated by analogy with the example discussed supra of a client revealing confidential information to an attorney in the privacy of the attorney's office with the closed office door, such that an electrician walks into the office and hears a confidential communication. For that example, had the attorney posted a conspicuous warning on the outside of his office door that informed an approaching person not to enter and that a confidential conversation is in progress, the electrician would have been informed that a confidential communication is taking place in the office and that unauthorized persons are not permitted to enter the attorney's office. Arguably, a reasonable person in the electrician's position would have been deterred from opening the office door.

Hence, even if the electrician opened the door notwithstanding the conspicuous warning, the existence of the conspicuous warning would strengthen the attorney's argument before a court that the unintentionally revealed conversational words to the electrician should be protected by the AC privilege from discovery and should likewise be inadmissible as evidence at trial.

The published PCOM message of the present invention provides a deterrent function that is analogous to that provided by the conspicuous message outside the attorney's office in the preceding example. Publication of a PCOM represents demonstrates the attorney's diligence in making an affirmative effort to deter an unauthorized person from accessing confidential attorney-client communications in the attorney's computerized database system. Thus, the present invention advantageously provides an argument to the court that the AC privilege should be preserved even if unauthorized access to confidential computerized data inadvertently occurs.

BRIEF DESCRIPTION OF THE DRAWINGS

FIG. 8 depicts a first example of a PCOM message, in support of the method of FIG. 5.

FIG. 9 depicts a second example of a PCOM message, in support of the method of FIG. 5.

DETAILED DESCRIPTION OF THE INVENTION

Figures 1, 3:
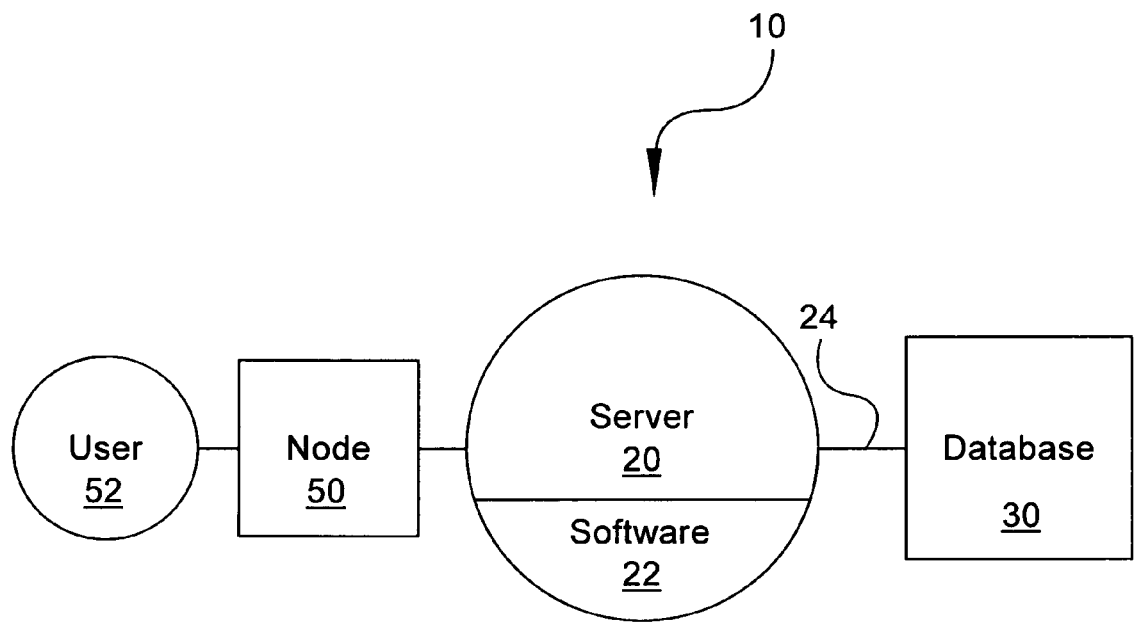
FIG. 1 depicts a data processing system including a server with software, a database, a node, and a user, in accordance with a preferred embodiment of the present invention.
FIG. 3 depicts the database of FIG. 1 comprising data objects.

FIG. 1 illustrates a data processing system 10 including a server 20, a database 30, a node 50, and a user 52, in accordance with a preferred embodiment of the present invention. The server 20 is a centralized computer that serves one or more nodes such as the node 50. The server 20 also includes software 22 that facilitates communication with, and management of, both the node 50 and the database 30. The data processing system 10 may include more than one node such as the three-node configuration shown in FIG. 2 with nodes 50, 60, and 70 and associated users 52, 62, and 72, respectively. In practice, the data processing system 10 may include any finite number of nodes.

The database 30 may have any physical or logical relationship to the server 20. For example, the database 30 may exist distinctly and remotely from the server 20 and electronically coupled to the server 20 by such hardware as telephone lines or television cable lines. Alternatively, the database 30 may exist as a component of, and in close proximity to, the hardware system of the server 20, such as on a disk or other data storage device located within the same room or building as the server 20.

The database 30 includes one or more data objects. A data object is any digital configuration including, inter alia, a binary bit, an ASCII character, a table of numerical data, an alphanumeric word, a document such as a letter or a memorandum, a file, a collection of files, a cell of a spreadsheet, a whole spreadsheet, a collection of spreadsheets, and a graphical image such as a depiction of a scene of a crime. As an example, FIG. 3 illustrates the database 30 as having the data objects 31, 32, . . . , 39. The database 30 may include any finite number of data objects. Note that the user 52 in FIG. 1 may, or may not, be authorized to access a given data object.

Figure 2:
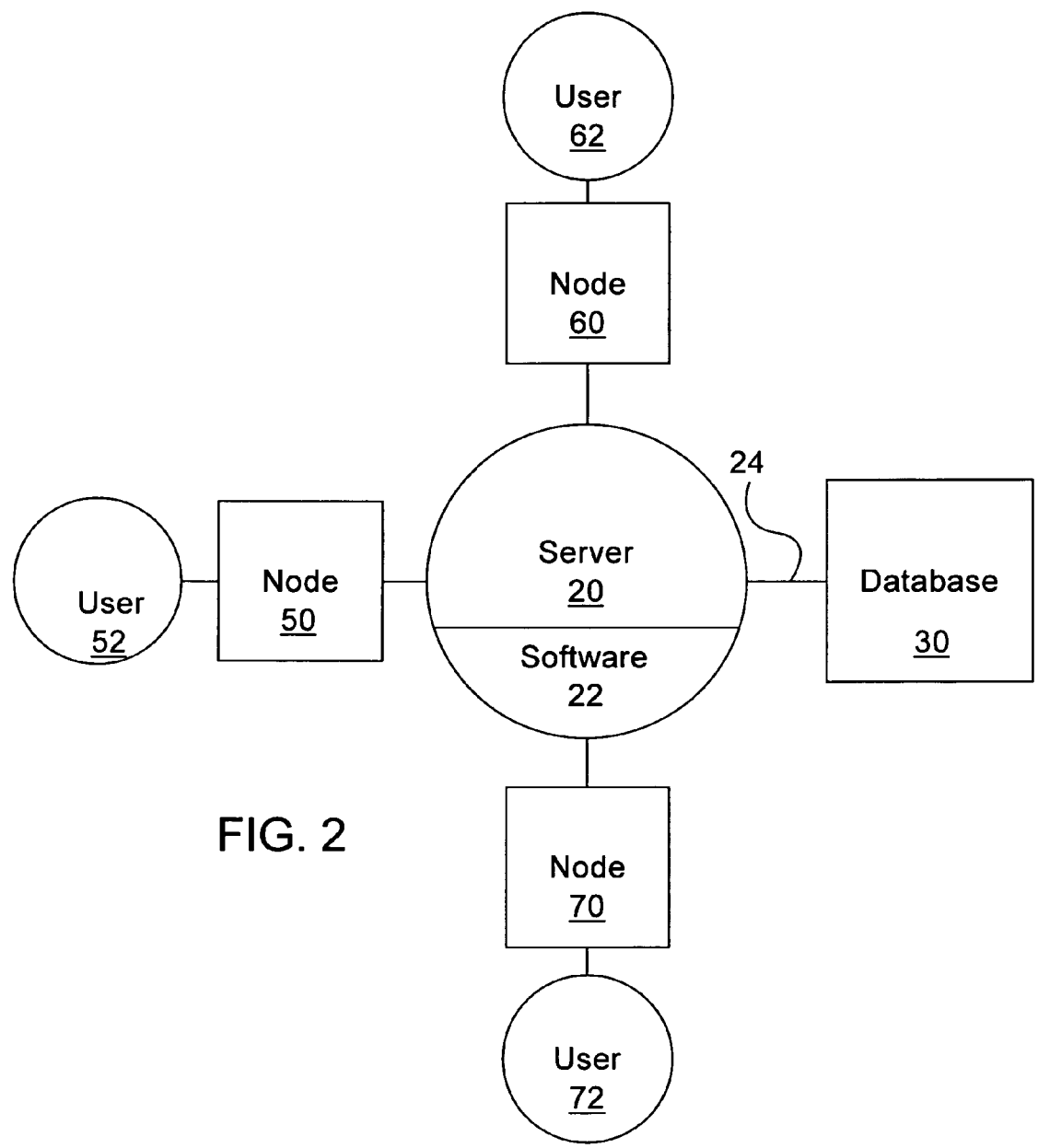
FIG. 2 depicts FIG. 1 with an addition of nodes and users

If the database 30 is an attorney-client database, the data processing system 10 may include users in relation to the attorney-client database. In FIG. 2, for example, the node 60 may be an attorney node that supports a user 62 who is an attorney or an attorney affiliate, and the node 70 may be a client node that supports a user 72 who is a client or a client affiliate. An attorney affiliate is one authorized by the attorney to use the attorney node 60, such as another attorney of record in the client's case, an associate attorney in the attorney's firm, or a legal secretary of the attorney. A client affiliate is one authorized by the client to use the client node 70, such as a secretary of the client.

A data object may include a confidential communication between the attorney and the client such that the confidential communication is a privileged communication (PCOM); i.e., protected by the AC privilege. More specifically, a PCOM is protected from being discovered during litigation by an opposing party of the client as well as from being inadmissible as evidence during the trial phase of the litigation. Although a data object in the database 30 may include a PCOM, the data object may likewise not include a PCOM. Inasmuch as the present invention includes publishing a PCOM message upon satisfaction of certain conditions, as will be discussed infra, the method of the present invention distinguishes between a data object that includes a PCOM and a data object that does not include a PCOM.

Figure 4:
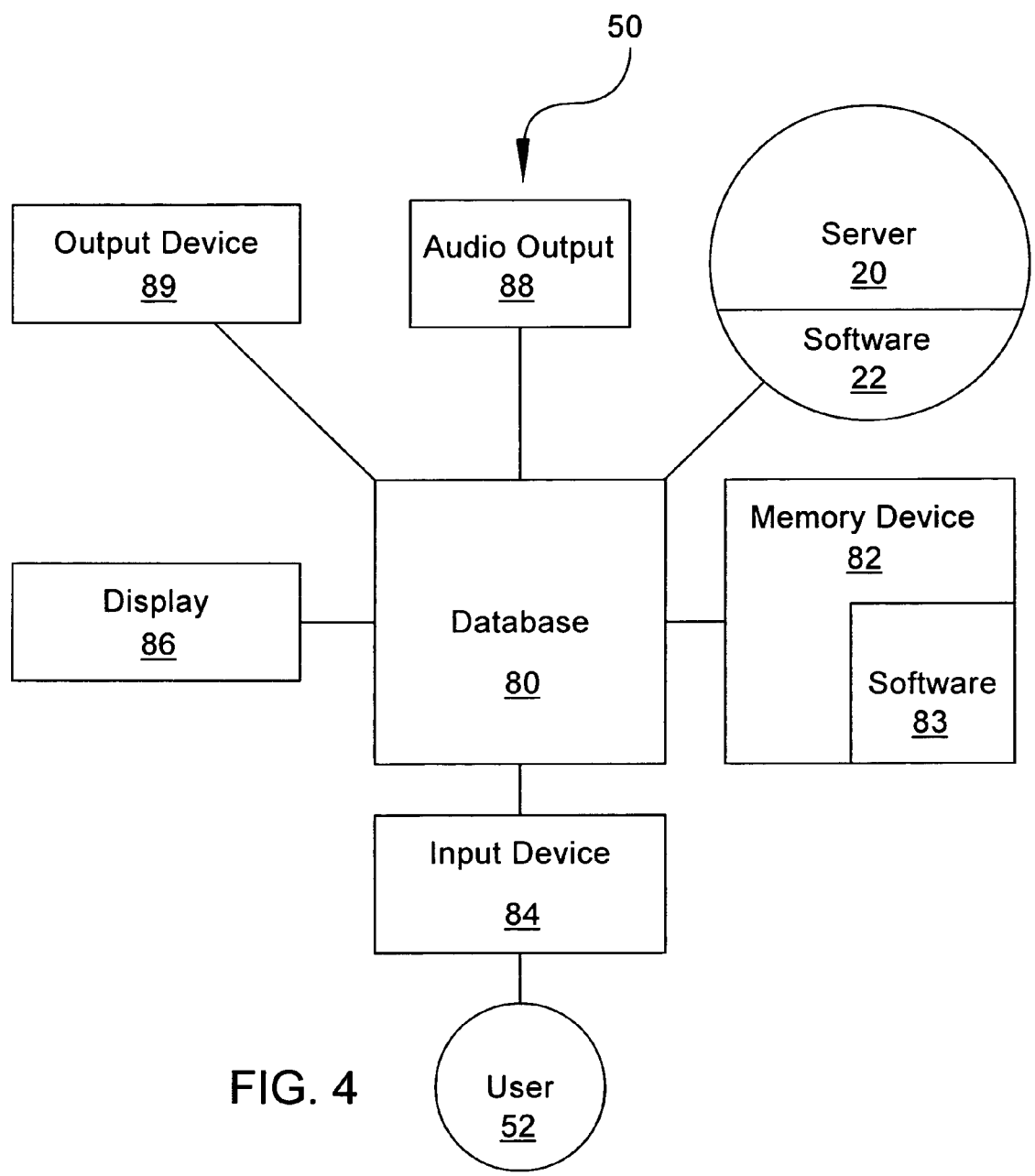
FIG. 4 depicts an example of a structure for the node of FIG. 1.

The node 50 shown in FIG. 1 represents any computerized station that is coupled to the server 20 and is also capable of being utilized by the user 52. FIG. 4 depicts an example structure of the node 50. The node 50 in FIG. 4 includes a processor 80 coupled to a memory device 82, an input device 84 such as a keyboard or mouse, a display 86, audio device 88 such as a speaker or an alarm, and an output device 89. The output device 89 may include, inter alia, a printer, a plotter, a tape unit, a disk drive, etc. Another possible output device 89 is a machine that performs a dynamic function such as generating an aroma, ejecting a balloon, or ringing a bell in an attempt to capture the attention of the user 52 when the user 52 is about to view privileged attorney-client communications. The output device 89 may be used in conjunction with a PCOM warning message appearing on the display 86 as will be discussed infra. If the processor 80 includes a central processing unit (CPU), then the node 50 in FIG. 4 may represent a workstation or personal computer that is coupled to the server 20. The memory device 82 may include any memory device that could be included with, or coupled to, the processor 80, such as random address memory (RAM), read only memory (ROM), a hard disk, and a floppy disk. The memory device 82 may also include, or be supplemented by, one or more remote memory devices such as may be included is a distributed memory network. One or more of such memory devices within and/or linked to the node 50 may function as real memory, virtual memory, or both. The memory device 82 may include software 83 that can be executed by the processor 80. The node 50 may also function solely as a computer terminal if the processor 80 lacks an independent computing capability and functions primarily to interface electronic signals between the server 20 and the additional devices including the input device 84, the display 86, and an audio output device 88.

The data processing system 10 of FIG. 1 preferentially represents a distributed computing system in which the server 20 manages one or more nodes, in accordance with a server-client model such as exists in: a global system such as the world wide web of the "Internet" with an associated Domain Name Service (DNS), a system distributed over a large geographical area such as a wide area network (WAN), or a geographically-confined system such as a local area network (LAN). Nonetheless, the data processing system 10 may also represent a stand-alone computer system, such as a personal computer or a stand-alone workstation if the server 20 and the node 50 are in close physical proximity such as being located, inter alia, within the same physical enclosure, on the same desktop surface, or in the same room, and if the node 50 is the only node of the data processing system 10. Thus a stand-alone computer system is within the scope of the preferred embodiment of the present invention, in addition to the distributed computing systems mentioned supra.

The user 52 in FIG. 1 includes a person interacting with the database 30 through the server 20 while at the node 10, wherein said interaction may include use of the input device 84 shown in FIG. 4. The user 52 in the context of the preferred embodiment is one who may be alerted to a PCOM message and subsequently responds to the PCOM message. This functionality of the user 52 may take the form of the user 52 making a request for accessing a data object in the database 30 and responding to the PCOM message should the request data object include a PCOM. Alternatively, an executing computer code at the node 50, such as may be included in the software 83 shown in FIG. 4, may make a request for accessing a data object in the database 30 with the user 52 being alerted to the fact that the computer code has requested access to a PCOM, wherein the user 52 may be prompted to respond to the request.

Figure 5:
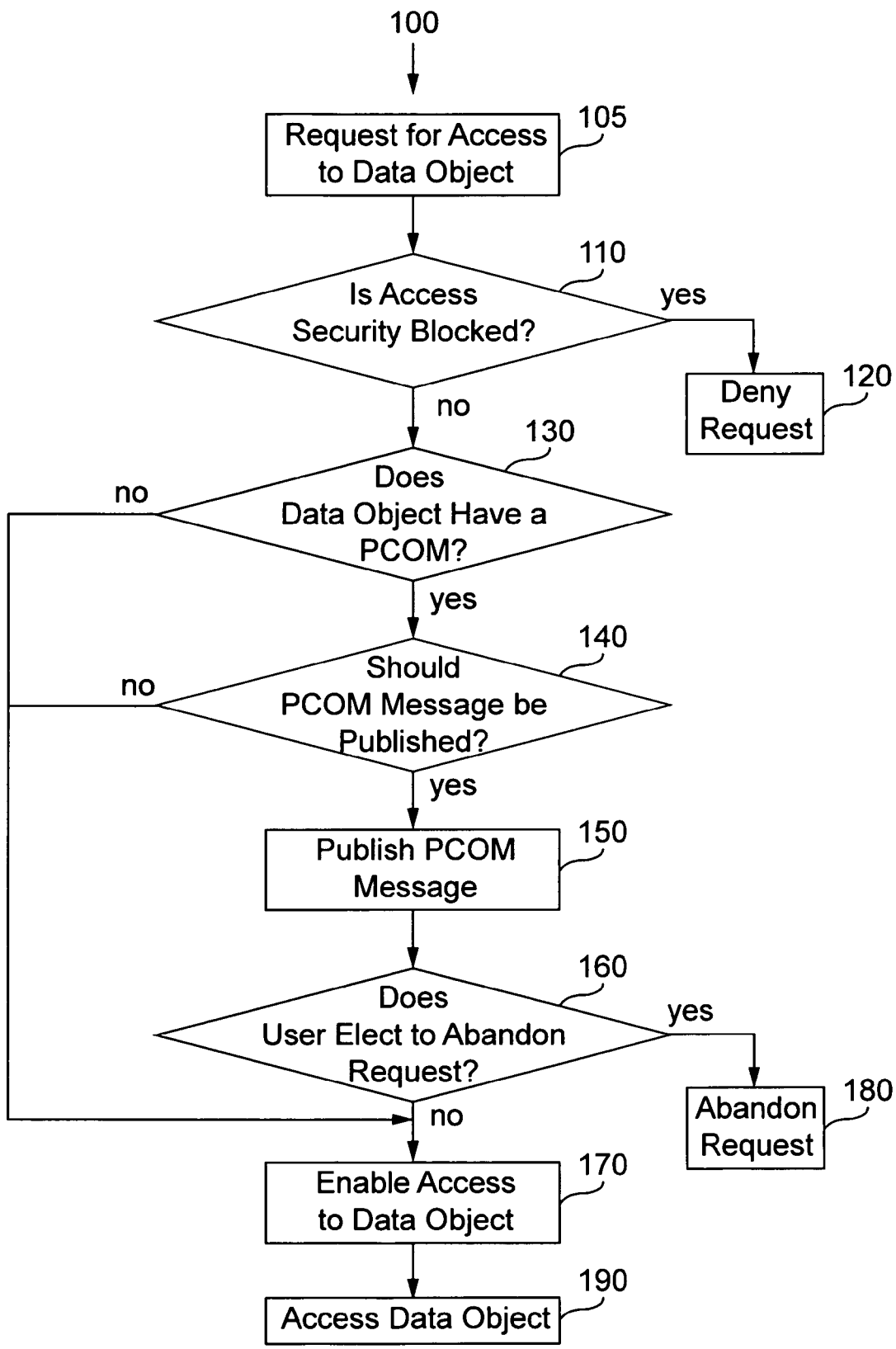
FIG. 5 depicts a method for publishing a privileged communication message (PCOM message) and accessing an associated privileged communication, in accordance with FIG. 1.
Figure 6:
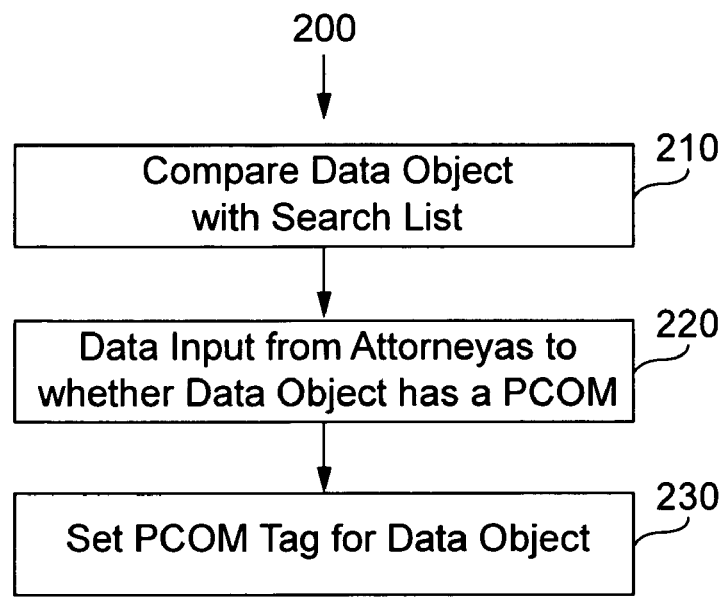
FIG. 6 depicts an example of security checking for access of the privileged communication, in support of the method of FIG. 5.
Figure 7:
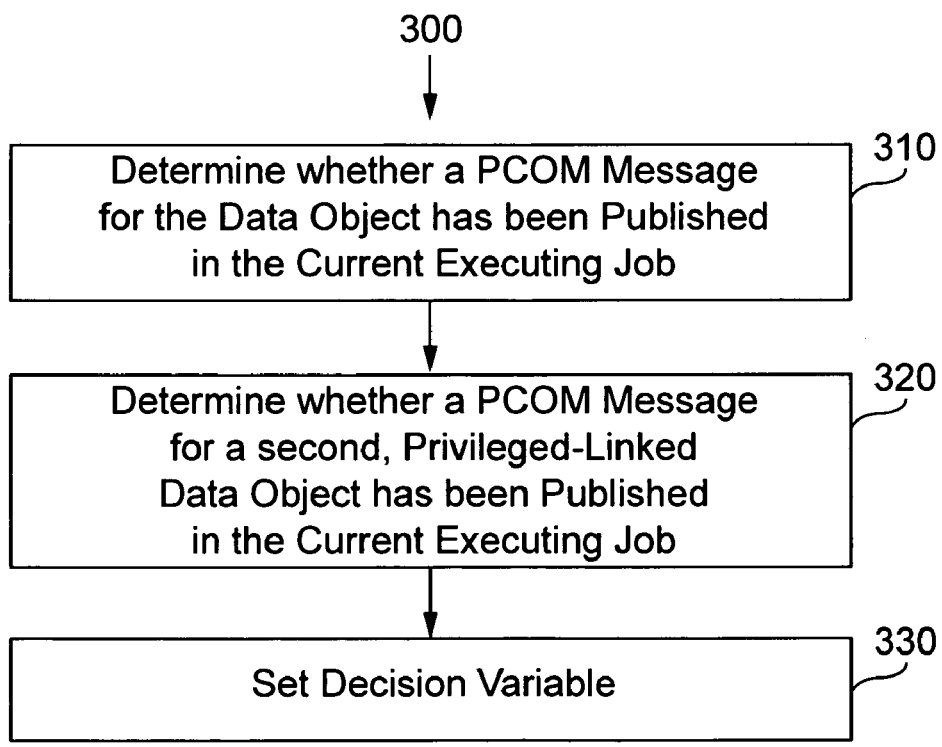
FIG. 7 depicts an example of determining whether the PCOM message should be published, in support of the method of FIG. 5.

FIGS. 5–7 illustrate methods for implementing the preferred embodiment, wherein the methods utilize the server software 22 shown in FIG. 1. FIG. 5 illustrates a method 100 for publishing a PCOM message, wherein the method is to be used in conjunction with the configurations of FIGS. 1–4, and wherein the database 30 is an attorney-client database that may contain a PCOM between an attorney and a client of the attorney. The client exchanging a PCOM with the attorney may be a client who is a person. The client may also be an organization such as, inter alia, a corporation, a labor union, a political party, etc., wherein the PCOM is between the attorney and a person in the organization such as an officer of the organization. The user 52 may include the client or a client affiliate who is authorized to access the PCOM. Such a client affiliate may include, inter alia, a secretary of an individual client or an officer, director, or agent of a corporate client. The user 52 may include the attorney or an attorney-affiliate who is authorized to access the PCOM. Such an attorney affiliate may include, inter alia, another attorney of record in the client's case, an associate attorney in the attorney's office, or a legal secretary of the attorney. The user 52 may also include a person who is unauthorized to access the PCOM, but erroneously gains access to the PCOM for any reason such as failure by an operating data security system to prevent the unauthorized access. The present invention serves to deter such an unauthorized person from gaining the unauthorized access.

The method 100 in FIG. 5 may be preceded by execution of software, such as that shown in FIG. 6, that distinguishing three possible status values of the data object in terms of a PCOM tag such as a variable TAG. The PCOM tag (TAG) for the data object may be set in accordance with the method 200 in FIG. 6. The PCOM tag has three possible values in accordance with the status value of the data object: TAG=+1 if the data object includes a PCOM, TAG=–1 if the data object does not include a PCOM, and TAG=0 if the data object has not yet been evaluated for whether the data object includes a PCOM. Prior to execution of the method 200, TAG=0 represents the status of the data object. The method 100 checks for a TAG=0 status, as will be described infra. Step 210 of the method 200 in FIG. 6 compares the data object for a match with a phrase in a predetermined search list of keyphrases, wherein a match increases the probability that the data object includes the PCOM. In step 220, the attorney inputs whether the data object has a PCOM, wherein the attorney may take into account the result of step 210 if step 210 has been executed. Alternatively, the input of step 210 may be provided by any person authorized by the attorney to do so, such as an associate attorney of the attorney's law firm. Next, TAG is set to +1 or –1 in step 230, depending on the result of step 210, step 220, both, or neither. The method 200 is any method that determines the status (TAG=+1 or TAG=–1) of the data object; the specific steps 210 and 220 are illustrative examples and are thus optional. For example, the status may have already been determined in a prior execution of the method 200. For some applications, all data objects in the database 20 (see FIG. 1) may be known to include a PCOM in which case the method 200 will invariably set TAG=+1.

Note that the values of TAG=+1, TAG=–1, and TAG=0 are arbitrary and were mentioned supra for illustrative purposes only. Any distinguishing indicator may be used to denote the three distinct status values of the data object. The indicator may be in the form of a variable (e.g., TAG), a pointer such as a pointer to a file or to an address in a memory device (e.g., a pointer to an address wherein the address may contain any one of 3 distinct values), or to any software or hardware technique capable of distinguishing 3 distinct status values of the data object. For notational convenience only, the TAG variable will be referred to infra as the distinguishing indicator when denoting the status of the data object.

Returning to the method 100 in FIG. 5 for publishing a PCOM message, the method 100 begins with a request 105 for access to a data object that exists in the database 30, such that the data object sought by the request may include a PCOM in the context of an attorney-client relationship. Accessing the data object may include, inter alia, reading and/or editing the data object. Step 110 determines whether to block (i.e., prevent) access to the data object for a data security reason. A data security reason for blocking access includes, inter alia, failure by the user 52 (see FIG. 1) to provide an acceptable password to the server 20 when logging in. A second data security reason for blocking access includes lack of permission for the user 52 to read or edit the data object. A third data security reason for blocking access includes lack of prior execution of the method 200 in FIG. 6 to determine whether the data object includes a PCOM, in which case TAG=0. Security blocking may be avoided with TAG=0, by executing the method 200 in FIG. 6 within step 110 whenever TAG=0. Thus, the method 200 of FIG. 6 may be executed either prior to executing the method 100 for the data object or as part of step 110 within the method 100. If access to the data object is security blocked, the request for access in step 105 is denied as shown in step 120.

If access to the data object is not security blocked, then step 130 determines whether the data object includes a PCOM, based on the result of executing the method 200 of FIG. 6 as described supra. If the data object does not include a PCOM (i.e., TAG=−1), then access is allowed by a branch to step 170.

If the data object includes a PCOM (i.e., TAG=+1), then step 140 is executed to determine whether to publish a PCOM message to alert the user 52 (see FIG. 1) that a PCOM (i.e., a confidential attorney-client communication) is about to be displayed or otherwise accessed. The decision in step 140 may always be to publish the PCOM message. Alternatively, the decision in step 140 may depend on the value of a decision variable that reflects conditions under which the PCOM message should not be published notwithstanding the fact that the data object includes a PCOM. The method 300 in FIG. 7 illustrates how a value of a decision variable may be established. The decision variable may be expressed in any binary form such as with, inter alia, use of a variable or a pointer, The decision variable is denoted as V for notational convenience only, such that V=1 (publish PCOM message) or V=0 (do not publish PCOM message). Step 330 sets V=1 or V=0 based on the result of steps 310 and 320. Step 310 determines whether a prior publication of a PCOM message for the data object (in the present executing job) has occurred. If so, V=1. If not, V=0. Many variations of step 310 are possible. For example, step 310 may determine that the PCOM message for the data object has been previously published n times where n>0, and wherein V=0 if n>2 and V=1 if n<2. Step 320 determines whether a PCOM message for a second data object in the database 30 (see FIG. 1), privileged-linked to the data object, has been published previously in the currently executing job. If so, V=1. If not, V=0. Definitionally, the second data object is privilege-linked to the data object if the data object includes a PCOM whenever the second data object includes a PCOM. Such privilege linking may occur between, inter alia, data objects which are each a cell in a spreadsheet, or files associated with a particular litigation involving the client. Many variations of step 320 are possible. For example, step 320 may determine that the PCOM message for the 20 second data object, privileged-linked to the data object, has been previously published n times such that n>0, wherein V=1 if n is even and V=0 if n is odd. The steps 310 and 320, and variations thereof, are illustrate ways in which the decision variable V may be established by the method 300, and are thus optional. The method 300 includes any criterion or criteria for setting V. As stated supra, V as utilized herein, is for notational convenience only and the actual decision variable of the method 300 may be represented in any computerized manner of simulating two independent values such as 0 and 1.

If the step 140 decides not to publish the PCOM message, then access to the data object is allowed by a branch to step 170. If the step 140 decides to publish the PCOM message, then the PCOM message is published in step 150. Step 150 may utilize any published warning message that alerts the user 52 that the requested access is to a data object that includes a PCOM, and that subsequent access to the data object requires proper authorization. A PCOM message may be structured or formatted in many different ways. FIGS. 8 and 9 provide illustrative examples of a PCOM message. The message in FIG. 9 includes identification of all persons authorized to access the PCOM, wherein any identification may used such as a name (e.g., John Q. Lawyer) or an access code (e.g., gebitsu). The PCOM message may be communicated to the user 52 at the node 50 by any publication means, such as by the visual display 86 or the audio output 88 (See FIG. 4) that articulates sound. The publication means may include any sensory means including emitting an aromatic gas from a gas-emitting device attached to the node 50, wherein a user's manual states that the aromatic gas publishes the fact that a PCOM is about to be accessed and that unauthorized access to the PCOM (and thus to the data object) should be avoided.

Following publication of the PCOM message in step 150 of FIG. 5, the user 52 may elect in step 160 to abandon the request. Abandoning the request occurs in step 180. Step 160 mitigates an error that has passed through the cracks of the data security check in step 110. If the data security software were 100% effective, a request for access that should be denied would truly be denied in step 120 as a result of execution of step 110. Step 160 provides a user with the opportunity to avoid unauthorized access to the data object. A reasonable user 52 who knows that the data object includes a privileged attorney-client communication, and knows that he or she should not access the data object, is likely to abandon the request. Thus, the PCOM publication in step 150 and the election to abandon the request afforded by step 160 provide an argument to a court that the attorney-client privilege has not been waived even if the user 52 wrongfully accesses the data object.

If the option to abandon the request is not elected, then access to the data object is enabled (i.e., allowed) in step 170 and the access occurs in step 190. As stated previously, access to the data record may include, inter alia, reading and/or editing the data object.

The methods 100, 200, and 300 illustrated in FIGS. 5, 6, and 7, respectively, and described supra, may be incorporated as computer software into a recordable medium such as, inter alia, a disk.

The present invention, as described supra for publishing a PCOM message in the context of privileged attorney-client communications stored in a database, is likewise applicable to any form of privileged communication stored in a database system including, inter alia, privileged communication between: a psychotherapist and a client of the psychotherapist, a husband and a wife, and a physician and a patient of the physician.

While preferred and particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

I claim:

1. A data processing method, comprising the steps of:
providing a server, a data object coupled to the server, and a node coupled to the server;
sending a request from the node to the server for access of the data object by the node,
checking for whether the requested access is security blocked;
if the requested access is not security blocked, determining whether the data object includes a privileged communication (PCOM) between an attorney and a client of the attorney;

if the data object includes the PCOM, deciding whether a PCOM message for the data object is to be published at the node; and if the PCOM message is to be published, publishing the PCOM message at the node.

2. The data processing method of claim 1, further comprising after publishing the PCOM message:

deciding by a user at the node whether to abandon the request for said access;

if deciding to abandon, user-abandoning the request; and if deciding not to abandon, user-electing not to abandon and enabling said access.

3. The data processing method of claim 2, further comprising after enabling said access, user-accessing the data object including selecting from the group consisting of reading the data object, editing the data object, and combinations thereof.

4. The data processing method of claim 2, wherein the step of deciding by a user includes selecting the user from the group consisting of the attorney and an attorney-affiliate who is authorized to access the data object.

5. The data processing method of claim 2, wherein the step of deciding by a user includes selecting the user from the group consisting of the client and a client-affiliate who is authorized to access the data object.

6. The data processing method of claim 2, wherein the user is not authorized to access the data object.

7. The data processing method of claim 1, wherein the providing step further includes providing an input from the attorney as to whether the data object includes the PCOM, and wherein the determining includes a dependence on said input.

8. The data processing method of claim 7, wherein the providing step further includes ascertaining whether the data object includes a phrase in a search list, and wherein the determining includes a dependence on a result of said ascertaining.

9. The data processing method of claim 1, wherein the determining step includes always determining that the data object includes the PCOM.

10. The data processing method of claim 1, wherein the publishing step includes visually displaying the PCOM message.

11. The data processing method of claim 1, wherein the publishing step includes articulating the PCOM message by sound.

12. The data processing method of claim 1, wherein the publishing step includes displaying the PCOM message including identifying all persons authorized to access the PCOM.

13. The data processing method of claim 1, wherein the deciding step includes a dependence on a decision variable.

14. The data processing method of claim 13, wherein the steps of the data processing method are executed in an executing job, and wherein the decision variable includes a dependence on whether the PCOM message for the data object has been previously published in the executing job.

15. The data processing method of claim 13, wherein the steps of the data processing method are executed in an executing job, wherein the decision variable includes a dependence on whether a PCOM message for a second data object has been previously published in the executing job, wherein the second data object is coupled to the server, and wherein the second data object is privileged-linked to the first data object.

16. A data processing system, comprising:
a data object;
security means for determining whether an access to the data object is security blocked:
status means for making a determination as to whether the data object includes a privileged communication (PCOM) between an attorney and a client of the attorney;
publication means for publishing a PCOM message for the data object; and decision in cans for deciding whether to execute the publication means to publish the PCOM message for the data object, wherein the decision means includes a dependence on the determination made by the status means.

17. The data processing system of claim 16, further comprising:
election means for deciding whether to abandon a prior request for the access; and
enabling means for enabling the access.

18. The data processing system of claim 16, wherein the status means includes a dependence on an input from the attorney as to whether the data object includes the privileged communication.

19. The data processing system of claim 18, wherein the status means includes a dependence on a result of a key-phrase search for determining whether the data object includes a phrase in a search list.

20. The data processing system of claim 16, wherein the status means always determines that the data object includes the PCOM.

21. The data processing system of claim 16, wherein the publication means includes means for generating a visual display of the PCOM message.

22. The data processing system of claim 16, wherein the publication means includes means for generating an audio articulation of the PCOM message.

23. The data processing system of claim 16, wherein the publication means includes means for displaying an identification of all persons authorized to read the PCOM.

24. The data processing system of claim 16, wherein the decision means further includes a dependence on a decision variable.

25. The data processing system of claim 24, further comprising:
an executing job; and
prior-publication means for making a determination as to whether the publication means has previously published in the executing job the PCOM message for the data object, wherein the decision variable includes a dependence on the determination made by the prior-publication means.

26. The data processing system of claim 24, further comprising:
a second data object within the computer system, where the second data object includes a second PCOM between the attorney and the client, and wherein the second data object is privileged-linked to the first data object;
an executing job; and
prior-publication means for making a determination as to whether a PCOM message for the second data object has been previously published in the executing job, wherein the decision variable includes a dependence on the determination made by the prior-publication means.

27. The data processing system of claim 16, further comprising:
a server coupled to the data object;
an attorney node coupled to the server, for enabling the attorney to interact with the data object; and a client node coupled to the server, for enabling the client to interact with the data object.

28. The data processing system of claim 27, wherein the server and the client are in accordance with a client server-model within a distributed computing system selected from the group consisting of a world wide web of the Internet, a wide area network, and a local area network.

29. A computer program product, comprising:
a recordable medium; and
computer software recorded on the recordable medium, wherein said computer software includes:
  security software for determining whether an access to a data object is security blocked;
  status software for making a determination as to whether the data object includes a privileged communication (PCOM) between an attorney and a client of the attorney;
  publication software for publishing a PCOM message for the data object; and
  decision software for deciding whether to execute the publication software to publish the PCOM message for the data object, wherein the decision software includes a dependence on the determination made by the status software.

30. The computer program product of claim 29, further comprising:
election software for deciding whether to abandon a prior request for the access; and
enabling software for enabling the access to the data object.

* * * * *

UNITED STATES PATENT AND TRADEMARK OFFICE
CERTIFICATE OF CORRECTION

PATENT NO. : 7,024,699 B1
APPLICATION NO. : 09/383691
DATED : April 4, 2006
INVENTOR(S) : Delaney Page 1 of 1

It is certified that error appears in the above-identified patent and that said Letters Patent is hereby corrected as shown below:

Column 3
Line 12, delete "represents"

Column 4
Line 65, delete "is" and insert -- in --

Column 7
Line 46, delete "20"
Line 49, delete "are"

Column 10
Line 8, delete "in cans" and insert -- means --

Signed and Sealed this

First Day of August, 2006

JON W. DUDAS
*Director of the United States Patent and Trademark Office*